United States Patent
Callahan et al.

(10) Patent No.: US 6,396,473 B1
(45) Date of Patent: May 28, 2002

(54) OVERLAY GRAPHICS MEMORY MANAGEMENT METHOD AND APPARATUS

(75) Inventors: Sean M. Callahan, St. Paul, MN (US); David R. Anderson, Saratoga, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/299,454

(22) Filed: Apr. 22, 1999

(51) Int. Cl.$^7$ ................................................ G09G 5/00
(52) U.S. Cl. ........................................ 345/113; 345/619
(58) Field of Search ........................... 345/113–116, 435, 345/536, 543, 531, 561, 548

(56) References Cited

U.S. PATENT DOCUMENTS

| | | | | |
|---|---|---|---|---|
| 4,868,557 A | * | 9/1989 | Perlman | 340/799 |
| 5,548,340 A | * | 8/1996 | Bertram | 348/559 |
| 5,673,401 A | * | 9/1997 | Volk et al. | 395/327 |
| 5,889,529 A | * | 3/1999 | Jones et al. | 345/439 |
| 5,926,647 A | * | 7/1999 | Adams et al. | 395/800.36 |
| 5,999,189 A | * | 12/1999 | Kajiya et al. | 345/430 |
| 6,108,014 A | * | 8/2000 | Dye | 345/507 |
| 6,154,207 A | * | 11/2000 | Farris et al. | 345/328 |

* cited by examiner

Primary Examiner—Bipin Shalwala
Assistant Examiner—Vanel Frenel
(74) Attorney, Agent, or Firm—Workman, Nydegger, Seeley

(57) ABSTRACT

The invention frees up memory to other uses by allocating memory to video graphics buffering only to the extent required. It also saves graphic processor bandwidth by processing, e.g. blending, only to the extent required. It does so by defining a regular grid of so-called tiles or cells in the overlay graphic data window, e.g orthogonally arrayed squares of 32-pixel sides, and allocating memory only to those requiring update, i.e. only those that are visible and subject to change between successive frames. Allocation is dynamic and requires little tagging overhead to keep track of the tiles in memory by location in the video graphic window. Processing is only of those tiles for which memory is allocated, since entirely transparent tiles within the window require no blending or processing whatsoever because they are invisible. In one implementation, only onscreen buffered graphics are tiled and the offscreen buffered graphics require full-sized memory allocation and in another offscreen buffered graphics are tiled also by clipping within variously sized buffers during successive passes through a drawing operation wherein the various sized buffers all are smaller than the entire window. New offscreen buffer-processed tiles may be swapped as they are processed for existing (visible) onscreen tiles directly, when there is less available memory, or new tiles may be processed and block-stored in memory until a wholesale swap can occur invisibly, when there is more memory available.

26 Claims, 4 Drawing Sheets

|  CUBS | 4 |  | (6,1) |
|  CARDS | 2 |  | (6,2) |
| (1,3) | (2,3) | (3,3) | (4,3) | (5,3) | (6,3) |

FIG. 4A

|  CUBS | 4 | (4,2) | (6,1) |
|  CARDS | 4 |  | (6,2) |
| (1,3) | (2,3) | (3,3) | (4,3) | (5,3) | (6,3) |

FIG. 4B

OVERLAY GRAPHICS MEMORY MANAGEMENT METHOD AND APPARATUS

TECHNICAL FIELD

The present invention relates to the display of transparent video overlays on a display monitor. More specifically, it concerns a memory management and buffer organization technique for preserving memory and pixel processor bandwidth while processing overlay graphic images for display on a monitor.

BACKGROUND OF THE INVENTION

With the advent of the Internet, there has been explosive growth in the number of people who access data from resources available online. These resources include World Wide Web pages which provide access to various types of digital data, including graphic images (both still and video). On occasion, it may be desirable to overlay such a graphic image on a background graphic image such as broadcast video, decoded MPEG, recorded video, or the like.

One system in which such graphic image overlay is desirable is an Internet access system such as the WEBTV® Internet access network. (WEBTV is a registered trademark of WebTV Networks, Inc. of Mountain View, Calif.) The WEBTV Internet access network includes a large number of Internet terminals, also referred to as client terminals, which present graphic images retrieved from the Internet. The WEBTV Internet access network also includes at least one Internet server, which provides a convenient standardized interface to facilitate access of the Internet by the client terminal. The server also offers supplemental services, such as email, news reports, television program guides and enhanced access to certain web pages. Typically, the graphic images retrieved from the Internet are presented in conjunction with other graphic images, often a video program or the like.

When it is desired to present a non-obtrusive graphic overlay, video background material and graphic overlay material may be blended in a transparent way in a defined area of the screen such that the video background source and the graphic overlay are both visible but with somewhat reduced contrast. This transparent graphic overlay mode of operation permits the viewer of a display monitor to continue to watch, for example, a favorite television program, while nevertheless monitoring the progress of a breaking news story or sports score update unobtrusively in a defined, typically smaller, area of the display monitor's screen.

The blending performed by the hardware graphic processor, as used herein, refers to the fact that the visible image within the overlay window represents a blended mix of both video background material and one or more graphic overlay images. The producers of home entertainment devices that provide such overlay capability determine a desired blend, or transparency factor. For example, a transparency factor or blend of 50% would represent a 50—50 contribution from the video background material and the graphic overlay material, presented in a smooth and regular way across the two-dimensional window that is affected by blending.

Blending will be understood to be a process by which the color and intensity components of a video image are set as desired. For example, the red, green and blue (or alternative tri-color phosphors) and intensity components for each pixel within the graphic overlay window are determined by multiplying the video background data by a weighting factor, e.g. 70, and by multiplying the graphic overlay data by a complementary weighting factor, e.g. 30, to produce a full-screen output buffer for raster scanning on the display monitor.

Those of skill in the art will appreciate that the overlay graphic data source may be disk, tape, CD ROM, CCD memory or any other memory device capable of storing graphic data to a data storage medium and reading data from the storage medium and writing the data to an operatively connected memory such as semiconductor memory or what is referred to herein as RAM. In other words, any mass storage device capable of having its graphic data contents read therefrom may be a suitable overlay graphic data source, within the spirit and scope of the invention.

Such overlay techniques typically include allocation of an entire overlay-sized area in memory for update buffering of the pixels that make up the graphic overlay image. This is because, although the graphic overlay image is presented typically in a fixed area of the display monitor's screen, its contents nevertheless are subject to change from field to field or frame to frame. Because the overlay graphic image is subject to change over time, its representation in memory must be updated periodically, e.g. typically at the refresh or vertical raster scan rate of the display monitor. This imposes a substantial memory allocation burden related to buffering the image and also imposes a substantial burden on the video or graphic processor that must blend each pixel within the overlay window with the corresponding pixel in the video background to produce what will be referred to herein as a blended output for presentation on the display monitor.

It is straightforward to use one or more buffer memories to store overlay graphics for transparent display over, for example, television video backgrounds, each buffer being equal in size with the number of pixels in the visible screen area of a display monitor, regardless of the spatial extent of the transparent overlay graphics and regardless of the extent of change occurring between successive frames (fields).

However, such technique is extremely memory intensive and requires significant pixel processing bandwidth, or power and time, to perform the pixel-by-pixel transparency weighting computations. Memory and processor bandwidth are at a premium. Such an approach to memory allocation might assume that all pixels within the overlay graphic window are visible (as opposed to entirely transparent) and that all pixels change between successive frames, so that two entire display monitor screen-sized buffers—an offscreen buffer for updating as the overlay graphic within the window changes, and an onscreen display buffer for blending with the video to produce the onscreen image—must be stored in memory and processed by the graphic processor even if only a few pixels therein are of such visible or changing character.

SUMMARY OF THE INVENTION

The invention frees up memory to other uses by allocating memory to graphics buffering only to the extent required. It also saves graphic processor bandwidth by processing, e.g. pixel blending as described above, only to the extent required. It does so by defining a regular grid of so-called tiles or cells in the overlay graphic data window (e.g. orthogonally arrayed squares of 32-pixel sides) and allocating memory only to those requiring update (i.e. only those that are visible and subject to change between successive frames). Allocation is dynamic and requires little tagging overhead to keep track of the tiles in memory by location in the graphic window. Processing is only of those tiles for which memory is allocated, since entirely transparent tiles within the window require no blending or processing whatsoever because they are invisible.

In one implementation, only onscreen buffered graphics are tiled and the offscreen buffered graphics require full-sized memory allocation. In another implementation, offscreen buffered graphics are tiled also by clipping within variously sized buffers during successive drawing operation passes wherein the various sized buffers all are smaller than the entire window. When there is less memory available for allocation to buffering, new offscreen buffer-processed tiles may be swapped for existing (visible) onscreen tiles as the offscreen tiles are processed. Alternatively, when there is more memory available, new tiles may be processed and block-stored in memory until a wholesale swap can occur invisibly.

The effect of blending within a graphic overlay window is illustrated in FIG. 1, wherein it may be seen that both the video background image and the graphic overlay image are visible within the window in the upper left-hand corner of the display monitor's screen. The fact that the overlaid images are each of slightly lower contrast than would be seen if the two images were displayed in non-overlapping areas of the display monitor's screen has been deemed acceptable to viewers because of the overlay window's enhanced content.

A hardware pixel processor (part of the hardware graphic processor) may perform such blending of the contents of the onscreen graphic display buffer and the video buffer for raster scanning by the display monitor's electronics. The onscreen graphic display buffer contains flicker-free overlay graphic pixels representing the graphic overlay window region or regions of the display. The processing overhead of blending each pixel based upon a percentage contribution from each of two sources—the video program material and the graphic overlay update buffer—is significant because each pixel within the graphic overlay window (which may easily number in the tens of thousands) must be so processed every refresh period, e.g. 50 or 60 times per second under current television industry standards.

It may be understood, then, that such approaches to presentation of transparent graphic overlays of video program material have been memory bandwidth-intensive and graphic processor-intensive. Typically, three buffers have been dedicated to the task, one for video material, one for offscreen graphic compositing or blending and one for onscreen graphic display. Also, typically, the graphic processor has processed every pixel within the graphic overlay window, whether it required processing or not. Under such approaches, no differentiation is made between pixels within the graphic overlay window which actually require expensive buffering and processing and those that do not. Slow and expensive buffering and processing are the by-product of such old ways of thinking.

BRIEF DESCRIPTION OF THE DRAWINGS

FIGS. 4A and 4B schematically illustrate the result of tiling a transparent overlay graphic image, with FIG. 4A illustrating such an overlay before processing and with FIG. 4B illustrating such an overlay after processing in accordance with the invention, with a dashed tiling grid shown in both figures for the sake of clarity.

DETAILED DESCRIPTION OF THE INVENTION

Figure 1:
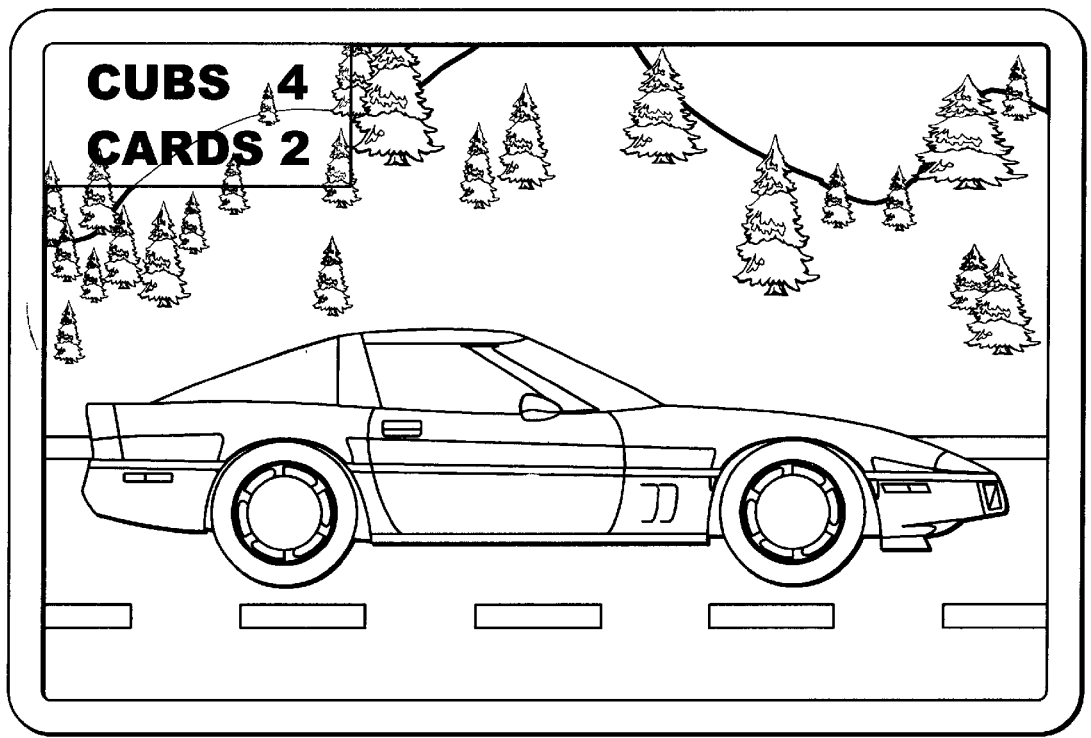
FIG. 1 illustrates a video background display with a transparent overlay graphic image thereon.

FIG. 1 illustrates a video background display with a transparent overlay graphic image thereon. For simple illustration purposes, a single frame of the video background of a car and driver in the mountains is shown. Also shown, in the upper left-hand corner of the display screen is a transparent overlay graphic image of a baseball game score box. It will be appreciated that the transparent overlay permits concurrent viewing of a video background image as well as visual monitoring of an overlay graphic image.

Those of skill in the art will appreciate that the background video image typically may be a video image such as a motion picture and that the overlay graphic image typically may be a subject that may be as demanding from a video processing standpoint as a motion picture, or that may be as straightforward as a still graphic legend or logo. Examples of graphic overlay images are a video or motion picture, a stock market prices display, a network or affiliate identifier logo, a running baseball score (as depicted illustratively herein in FIGS. 1, 4A and 4B), an advertisement or announcement, a headline news bulletin, a sketch-pad, a simulated keyboard, an interactive game board, or the like. Graphic overlay images will be understood to include any subject that is usefully viewed when blended on screen with any other subject and overlaid for concurrent viewing of both subjects on the same display screen. Thus, broadly speaking, the invention involves a first and second graphic image overlay and presentation-for-viewing method and apparatus.

Those of skill in the art will appreciate that the context for application of the invention is whenever one or more graphic overlays is presented for viewing on a display monitor containing a background graphic (still or video). The context further will be appreciated to include those applications where, as described herein, the background image is a video image, and where it is desired generally to be able to watch the video action in the video area of the display monitor's screen, while also being able to read the graphics within the one or more graphic overlays.

Such graphic overlays in which it is possible to read such graphics will be referred to herein as windows. Such windows may be of virtually any shape, but are shown, for simplicity, as having a generally rectangular form.

For the purpose of updating the contents of such overlay windows in order to refresh or raster scan the display monitor each field or frame, one or more regions of digital memory are allocated to describe the changing contents of the windows. Such digital information is typically stored within such digital memory and includes individual color pixel information for each pixel within the one or more windows. Where the graphic overlays are rectangular, the overlay windows or regions may be subdivided into an array of square cells, as will be seen by reference to FIGS. 3, 4A and 4B. It will be appreciated, however, that although square cells are described and discussed, cells of other geometries may also be used.

Figure 2:
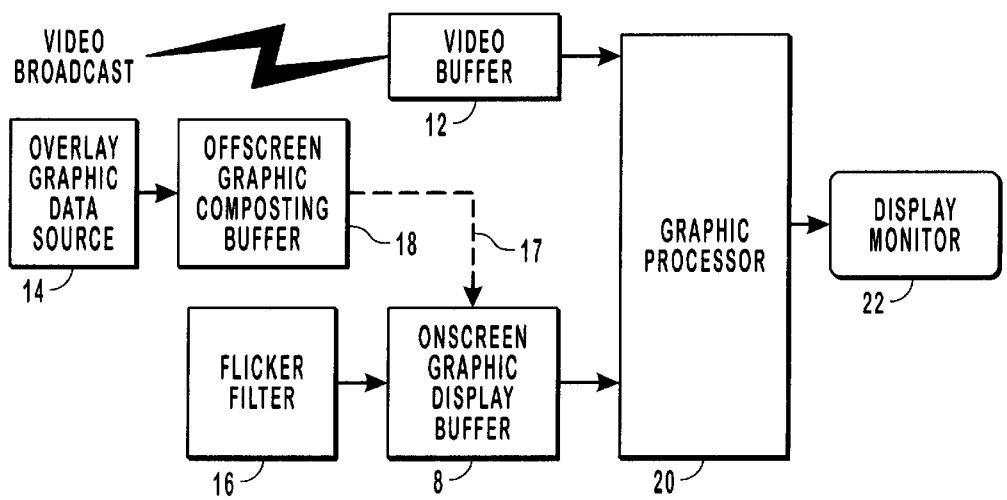
FIG. 2 is a block diagram of a conventional video processing and buffering mechanism for blending input video background source material with a transparent graphic overlay.
Figure 5:
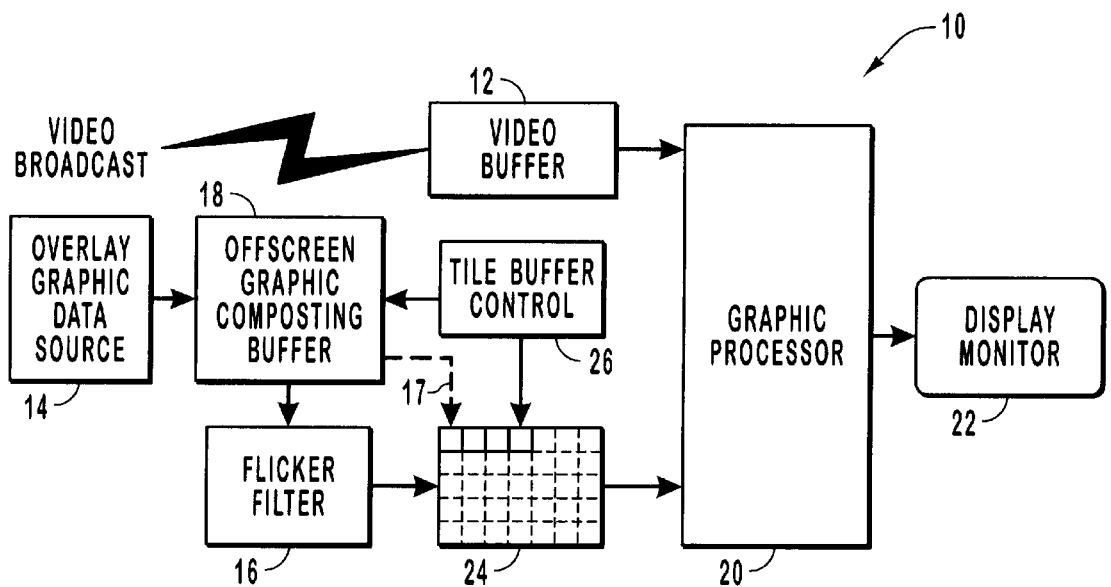
FIG. 5 is a schematic block diagram of the way in which transparent graphic overlay buffer memory is allocated in accordance with the invention.

It will be understood that FIGS. 2 and 5 are similarly organized and share common elements identically labeled by reference designators, with the important features of FIG. 5 noted by distinctive reference designators that illustrate one embodiment of the invention.

Referring first to FIG. 2, a mechanism for blending a graphic overlay window with video background source material is illustrated in block diagram form. Typically, video background source material defines an array of pixels coextensive with the entire visible portion of the screen on the display monitor. This pixel array of typically video background material might be a television program or other cable, broadcast, satellite or graphic presentation on a television or computer monitor. This video background material in FIG. 2 is labeled VIDEO BROADCAST.

The video broadcast or other remote first graphic overlay image data source is buffered in a first buffer 12 identified as a video buffer because of its typically video contents. An overlay graphic data source 14 feeds data to an offscreen graphic compositing buffer 18 in which data processing is performed on successive frames of the graphic image to update the graphic image as instructed. Such processing may be performed, for example, by a microprocessor (not shown) that operates the home entertainment system of which the illustrated overlay and display apparatus is a part.

The composited and typically periodically or continuously updated contents of offscreen graphic compositing buffer 18 may be flicker filtered in a flicker filter 16 prior to being buffered in an onscreen graphic display buffer 8. It will be understood that flicker filter 16 is known to provide digital filtering to the offscreen graphic compositing buffer data such that there is substantially no visible flicker of the image data at tile boundaries in what may be thought of as an artifact of the plural-cell windows described herein.

Referring still to FIG. 2, it may be seen that onscreen graphic display buffer 8 and video buffer 12 feed a graphic processor 20. Graphic processor 20 blends the two graphic sources together to produce a raster scan signal for presenting blended data on a display monitor 22. The graphic processor may be a dedicated graphics microprocessor, a general-purpose microprocessor capable of performing graphic operations, etc. Display monitor 22 may be any suitable monochrome or color display such as a raster scan television, LCD or other display capable of displaying pixel data on a viewable screen.

Because the graphic image is subject to change, typically it is double buffered before it is presented to the graphic processor 20 for pixel blending and other processing. This is accomplished as shown, in FIG. 2, by a screen-sized offscreen graphic compositing buffer 18 where overlay graphics are formed and where any needed pixel changes are made, flicker filter 16 and a screen-sized onscreen graphic display buffer 8 that feeds graphic data to graphic processor 20 to blend the contents of onscreen graphic display buffer 8 with the contents of video buffer 12 for presentation on display monitor 22. Such blending is performed by the graphic processor in accordance with so-called alpha information stored in any suitable format, as is known, along with the accompanying pixel information in the onscreen graphic display buffer 8.

Figure 3:
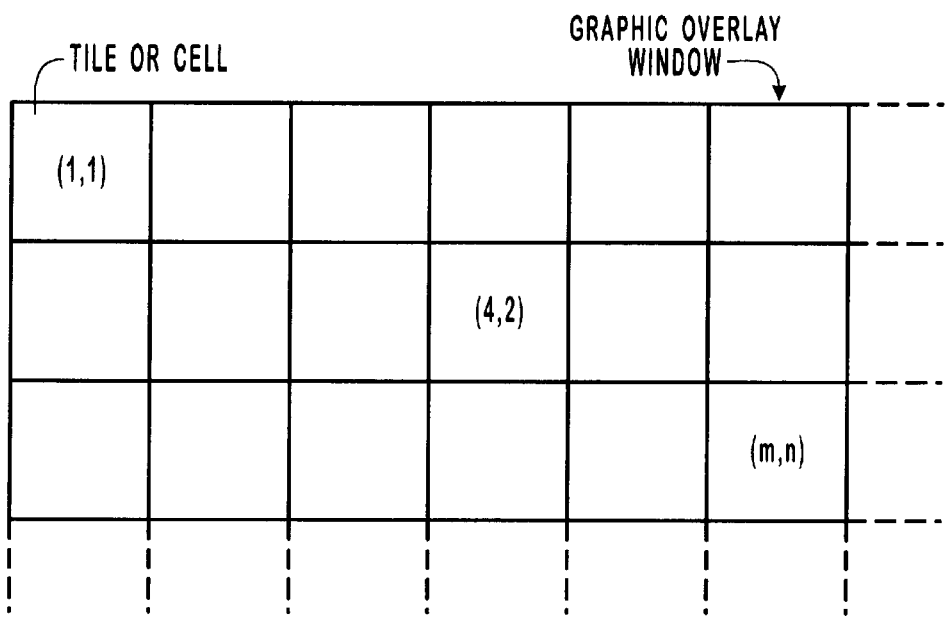
FIG. 3 is a block diagram of the invention showing the tiling process used in accordance with the invention to define boundaries for transparent overlay graphic image buffering and processing and to allocate memory and processor power thereto.

FIG. 3 illustrates the filing of an exemplary graphic overlay window. In accordance with the invention, the depicted graphic overlay window may be defined as being circumscribed by a rectangle that may be thought of as constituting an array of square cells, each containing a predefined number of pixels. Those skilled in the art will appreciate, however, that the graphic overlay window may be of virtually any size and shape, and that the graphic overlay window may be divided into cells of virtually any size and shape. Furthermore, cells within a graphic overly window may differ in size and/or shape.

As may be seen in FIG. 3, a window representing a region of the display screen is subdivided into a regular array of square cells, or tiles. Cell dimensions may be characterized as W-pixels wide by H-pixels high, but the cells are described herein, for illustrative purposes, as 32-pixels wide and 32-pixels high. Thus, the pixel information content of each exemplary cell is 32×32=1024 pixels. This cell size and shape has been determined to be easily managed in a memory buffer by addresses or indices appended to each cell's pixel data to describe the cell's location within the array of cells that make up a graphic overlay window.

Those of skill in the art will appreciate that the pixel data representing a cell and the cell data representing a tile within a mosaic need not be stored in contiguous or even proximate physical memory locations. Accordingly, in this disclosure, reference will be made to adjacent or neighboring cells, and it will be understood that such cells are proximate in terms of their location within a graphic overlay window but that their pixel data may be stored in physically remote memory locations related to one another only logically, as by use of coordinate tags or pointers also stored in memory.

By defining a graphic overlay window as an array of cells of given size and shape, it is possible to allocate memory dedicated to displaying updates only for those cells requiring memory storage allocation. Typically, it is found that graphic overlays are sparse, i.e. their contents are more often represented as empty of overlay graphics than as graphic elements. If the contents of a given cell within a current graphic overlay window is transparent, then there is no need to maintain or update an offscreen graphic composite buffer for the given transparent cell. Maintaining and updating a transparent cell is wasteful of memory and processor bandwidth.

It will be appreciated that a dynamic memory allocation scheme whereby no memory allocation is made when there is no memory allocation required can result in great memory savings. Generally, memory is at a premium and memory that is free for other uses tends to speed up the process of managing the various graphic buffers that are composited into the onscreen buffer that is raster scanned onto the display monitor. For example, if only five to ten cells within a window embracing 100 cells are subject to change over a significant period of time (such as seconds), then a significant savings is realized in terms of memory allocation particularly with respect to the onscreen buffer, since only those five to ten cells subject to change take up space in memory, and then, only for so long as the changing conditions persist. All remaining cells, e.g. 90–95%, are simply refreshed from the video buffer memory, which of course is required whether there are changes or not in the overlay graphic display.

In FIG. 3, it may be seen that cells may be organized in a regular, easily managed array that, in accordance with the invention, may be represented in memory as a significantly reduced-size onscreen graphic display buffer containing only cells subject to updating. Only those cells subject to change need be allocated memory buffer space, leaving a potentially significant fraction of memory allocable to other data processes. Often memory allocation is dynamic and is handled by a dedicated memory-management unit (MMU) whereby memory is treated as a pooled resource to be allocated to various memory users on a first-come, first-served basis. Such memory management techniques as queues and stacks and pointers are well known to those of skill in the pertinent arts.

As may be seen from FIG. 3, cells may be thought of as being located in two-space by any convenient location coding scheme such as a simple Cartesian coordinate scheme whereby, for example, the upper left cell is represented by the ordered (x,y) pair, e.g. (1,1), and the lower right cell is represented by the ordered (x,y) pair, e.g. (m,n), where m is an integer representing the width of the graphic overlay window and where n is an integer representing the height thereof. The locations of intermediate cells similarly may be represented by their Cartesian coordinates within the array, wherein x may be thought of as the array's (vertical) column designator and y may be thought of as the array's (horizontal) row designator. Of course, it is possible there will be more than one overlay graphic window presented on display monitor 22 at a given time, and the reduced-size onscreen graphic buffer thus may contain tiles representing pixel information for cells from multiple windows, each suitably tagged with onscreen coordinate data.

Individual cells within a given window may be described by their position within the array, which may represent a physical position within a display screen scanned by the display monitor's raster scan electronics. Those of skill in the art will appreciate that the array may be defined to be smaller than the display screen. For example, the array may be defined to be congruent with a given window, which is typically smaller than the display screen. The game score window in the upper left-hand corner of the display screen illustrated in FIG. 1 thus might be represented as an array, and the individual cells within the window-sized array may be x, y indexes into such a smaller array. In the most general case, however, the array is coextensive with the entire display screen and it will be understood that one or more windows may be defined across the display screen and the cells therein may be addressed by their absolute, screen-relative x, y coordinates.

If only a few of the cells require processing between successive raster scans, then only those few cells need to be allocated an onscreen graphic buffer in memory. This memory saving is illustrated in FIG. 5 by a combination of dashed and solid lines describing a cellular array and four solidly lined cells therein representing areas in update buffer memory where pixel data might reside and be subject to update. Those cells that change between successive raster scan operations may be processed by pixel processors, although at greatly reduced overhead because of their significantly reduced number.

Those of skill in the art will appreciate that there is a tradeoff between the size of the defined tiles, or cells, and the storage and processing overhead associated with keeping track of the cell data in memory. Typically, 32×32 pixel square cells are used, but it will be understood that, within the spirit and scope of the invention, any suitable cell size and shape may be used. A larger cell size would impose less cell-management overhead (because there are fewer cells for which to allocate memory), but would raise the amount of memory allocation to accommodate changes between successive fields (because the granularity of the tiled, allocated image is high and thus there is a greater likelihood of change to a portion of the graphic image within any given cell).

FIGS. 4A and 4B show successive frames of the graphic overlay window of FIG. 1. Note that only the corner of the display monitor screen in which the graphic overlay is presented is shown in FIGS. 4A and 4B. All of the files on the remainder of the screen are entirely transparent, in accordance with the illustration of FIG. 1. It will be understood that there is no need to allocate file buffer space in memory for cells, or tiles, that are transparent or unchanged from their current contents and transparency factor represented in the onscreen graphic display buffer. The game score window may be seen to represent a constantly updated game score between the CUBS and the CARDS, wherein the CARDS have just gotten two additional runs to tie the CUBS at four runs apiece. The only portion of the overlay graphic image that changed—in either pixel content or transparency—between the successive frames was the CARDS' score. This changed portion of the image is represented in the invented tiling scheme as affecting only cell (4,2).

There is only one changed cell out of eight in the graphic overlay window and all other cells on the screen (not within the graphic overlay window) of the display monitor are entirely transparent. This means that only a fraction of the memory previously allocated to overlay graphic images needs to be allocated. It will be appreciated that the memory overhead associated with allocation of the cells (including memory pointers to the physical area of memory in which the affected cell resides and the affected cell's coordinates that represent its location within the graphic overlay window) is minimal, i.e. it may be on the order of a few percent at most.

The advantage is that only a fraction of the buffer memory that would otherwise be allocated is allocated in accordance with the invention. Such a memory savings is realized on two levels: 1) for as long as the overlay graphic persists as a fraction of the visible screen, the memory allocation is limited to that which corresponds to the visible (non-transparent) extent of the overlay graphic as a fraction of the entire screen and 2) to the extent that only a portion of a given overlay graphic undergoes change only a portion of the overlay graphic window requires space in the tile buffer. This compares extremely favorably to the prior requirement of an offscreen graphic compositing buffer memory allocation for the entire visible portion of the screen of the display monitor. Much of the time, it will be appreciated, no tile buffer allocation is required at all, because the graphics within many overlay graphic windows change only relatively infrequently, if at all, over time. Equally important, a large percentage of the pixel processing overhead is avoided, since only those cells that are not entirely transparent and only those cells that represent a change to the contents of the onscreen graphic display buffer need be processed by the graphics processor.

FIG. 5 is similar to FIG. 2, but highlights the important differences in architecture between conventional memory allocation and the invented memory allocation apparatus indicated at 10. FIG. 5 shows how video buffer 12, overlay graphic data source 14, flicker filter 16, offscreen graphic display buffer 18, graphic processor 20 and display monitor 22 are arranged and operated similarly to the arrangement described in relation to FIG. 2.

In contrast to the conventional overlay graphics processing mechanism, however, the output of offscreen graphic compositing buffer 18 feeds a tile buffer 24, which is under the control of a tile buffer control 26. Tile buffer control 26 will be understood to control the flow of pixel data including transparency information from offscreen graphic compositing buffer 18 via flicker filter 16, tile buffer 24 and graphic processor 20 to display monitor 22.

Those of skill in the art will appreciate that flicker filter 16 may be of conventional design, and within the spirit and scope of the invention may take any alternative form, e.g. flicker may be filtered from the edges of the graphics via hardware, firmware or software or any suitable combination thereof. If flicker is not a problem, flicker filter 16 may be eliminated as indicated by dashed arrow 17.

Those of skill in the art also will appreciate that tile buffer 24 is of variable size and is a region or regions of physical memory allocated by tile buffer control 26. Tile buffer control 26 may, for example, include a memory management unit (MMU) suitably programmed to allocate tiles as required by tile buffer 24 and to de-allocate tiles as they are no longer needed by tile buffer 24 because of a change in the overlay graphic window requiring that more or fewer tiles be allocated.

To avoid memory fragmentation, which is a common problem with dynamic memory allocation schemes, the MMU may be programmed to have a page size equal to the size of a tile or tile size may be adjusted to be the same as the MMU's page size. The term "page size" is used herein as it relates to memory allocation techniques whereby pages of data are allocated in blocks of predefined size referred to as pages. The result will be no wasted memory blocks and no fragmentation of memory. If page size and tile size are different, then typically memory fragmentation occurs in which disposed tile-sized blocks of free memory are interspersed throughout allocated memory. Such fragmentation can be undone by allocating new tiles into the memory 'holes' and copying the pixel data from the old tiles. The new tiles then are swapped into tile buffer 24, and the old, memory fragmenting tiles are disposed.

It will be appreciated that the allocation of tiles within tile buffer 24 in accordance with the invention is done only on an as-needed basis, thus to save significant space in limited memory and to save unnecessary processing in hardware. Thus, entirely transparent cells, such as those shown in FIGS. 4A and 4B at coordinates (1,3), (2,3), (3,3), (4,3), (5,3), (6,3), (6,2), (6,1), etc. take up no space in tile buffer 24. In the illustrated application of FIG. 1 most tiles of the screen of display monitor 22 are entirely transparent with respect to overlay graphics. (It will be understood that the invented method and apparatus may be applied to graphics having any level of transparency information including 1-bit, or so-called masked, graphics wherein a pixel is either on or off and not in between.)

Moreover, in the example presented in FIGS. 4A and 4B, only one of the tiles within the window changes, as will be understood by contrasting FIGS. 4A and 4B. Accordingly, tile buffer control 26 need control the re-writing or update of only one tile within tile buffer 24 pursuant to the change in the contents of offscreen graphic compositing buffer, producing an outstanding reduction in memory allocation and processing overhead especially in the case of the relatively sparse overlay graphic or a change that is limited in spatial extent.

In accordance with one embodiment of the invention, overlay graphics are drawn as necessary to reflect changes therein to offscreen graphic compositing buffer 18, as described above. Typically, offscreen graphic compositing buffer 18 is sized to the screen of display monitor 22 so that overlay graphics may be presented in any region of the screen without geographic limitation. Nevertheless, it is desirable to double buffer overlay graphic data so that changes or updates are made to an invisible-to-the-viewer offscreen buffer and are then swapped into a visible onscreen buffer to produce a clean change of the onscreen image. It will be understood that, in accordance with the invention, the allocation of memory to the onscreen buffer, i.e. tile buffer 24, is limited to an affected few pixels within the overlay graphic instead of extending to all pixels within the viewing screen.

Two techniques may be used to update tiles within the onscreen buffer, i.e. tile buffer 24, in accordance with the invention, depending upon the amount of available memory. Many times, space in memory allocable to video frame buffering is limited, i.e. once-available memory has been allocated by the MMU and/or microprocessor to other tasks such as video or other data file processing, scheduling or user input/output. When memory is limited to the extent that there is insufficient memory space allocable to provide for indirect and invisible processing of the offscreen buffer via manipulation of a copy of the offscreen buffer data to build an updated version thereof, the offscreen buffer itself, i.e. offscreen graphic compositing buffer 18, is processed directly to the existing onscreen tiles within the onscreen buffer. These updates require little additional memory but make parts of the update process visible to the viewer of the display monitor, i.e. display monitor 22, as the offscreen buffer is being processed. If more memory is available, then new tiles are created and swapped in for the old tiles to accomplish the update and the old tiles are 'disposed of', i.e. freed up for placement back into the stack of available memory blocks. This second approach requires allocating multiple tiles for the same area of the graphic overlay window, but provides clean and quick updates to the visible screen on the display monitor.

In accordance with the invention, a combination of these two techniques described above is used in what will be referred to herein as a dynamically adaptive allocation scheme. New tiles are allocated until either the entire offscreen buffer—the extent of which is congruent with the display screen—is processed or until no further memory cells are allocable to tile buffering. The tiles created so far are swapped into the onscreen buffer and the old tiles are deallocated from memory. The process is repeated for the remaining areas of the offscreen buffer until the update is complete. As a result, clean quick updates are accomplished when memory is plentiful and updates degrade gradually and gracefully when memory is limited.

Those skilled in the art will appreciate that the tiling scheme described and illustrated herein may also be applied to the offscreen buffer in a slightly different form. Instead of allocating the entire offscreen buffer, a smaller subsection of the offscreen buffer is allocated. Update operations that would normally be performed once using the offscreen buffer are performed instead multiple times using a smaller offscreen buffer. Multiple passes through the smaller buffer utilize known clipping of graphic features at the geometric boundaries of the smaller offscreen buffer, thereafter reusing the same smaller offscreen buffer for each subsequent pixel processing pass until the entire screen's image has been processed a piece at a time.

Each subsection of the offscreen buffer is processed for onscreen tiles before drawing the next one. It is possible to reduce the number of offscreen subsections to be processed if the total area of the offscreen to be drawn is known beforehand. The offscreen can be configured to cover as much of the area to be drawn as possible and requires fewer drawing and tile processing passes. In the case where relatively small areas of the screen change, e.g. the illustrated game score overlay graphic of FIGS. 1, 4A and 4B, the offscreen often can be processed in one pass, i.e. by the one-time processing of pixel data subject to change contained entirely within the reduced-size offscreen buffer.

Figure 6:
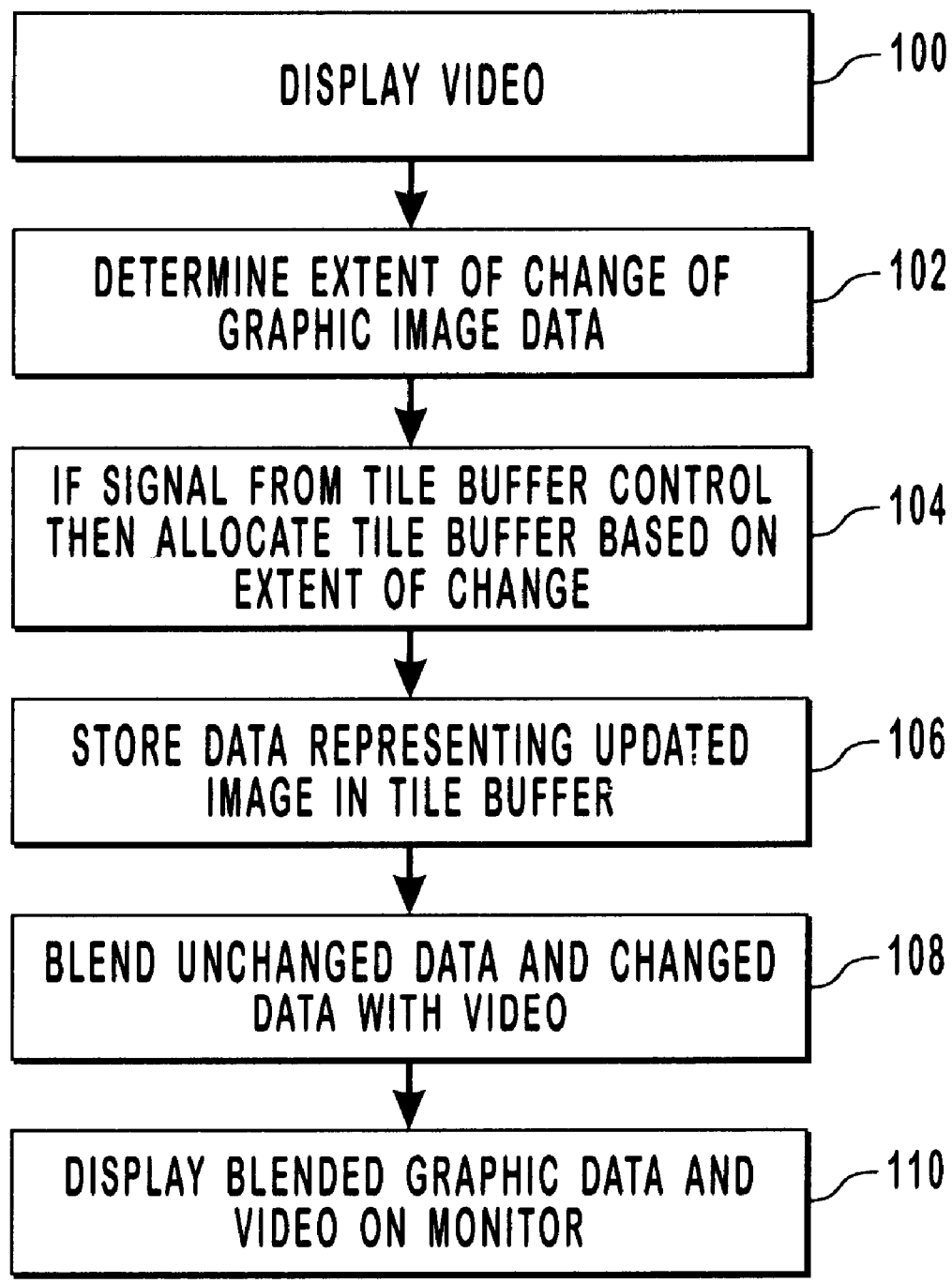
FIG. 6 is a flow diagram illustrating the steps of a transparent graphic overlay memory buffer allocation method in accordance with the invention.

FIG. 6 illustrates the invented method in flow chart form. The invented method will be understood to pertain to the overlaying of a first graphic image on a second graphic image on a display monitor. The first graphic image is a foreground image. The second graphic image is a background image, typically video received from a video source. The first graphic image data is stored in a first memory buffer. The method includes a) at 100, displaying the video background live as it is received; b) at 102, determining periodically the spatial extent of change (e.g., the extent of the area in which the image changes) in the graphic image data in the first memory buffer between successive time periods; c) at 104, allocating an update memory buffer having a size based at least in part on such spatial extent of change; d) at 106, storing into such update memory buffer data representing the updated graphic image; e) at 108, blending the unchanged data in the first memory buffer and the data in the update memory buffer with the video background image; and f) at 110, displaying the blended updated graphic image and the video background image on a display monitor.

It will be appreciated that such steps typically would be repeated indefinitely in the prescribed sequence, and that graphic processor 20 would read updated overlay graphic image data from tile buffer 24 or from offscreen graphic compositing buffer 18, depending upon whether tile buffer control 26 signals graphic processor 20 that tile buffer 24 has been allocated and contains a copy of the updated overlay graphic image data in accordance with the double buffering technique described and illustrated herein.

In accordance with the invention, the blending step includes the step of weighting the graphic image data with the video background image in a defined ratio to produce a transparent overlay of such graphic image data on the video background image for displaying. It will be understood that such defined ratio in which the weighting is performed is based upon the desired transparency of the graphic image relative to the video background image, and that such weighting sub-step typically is implemented by conventional blending techniques described in the background section.

Also in accordance with the invention, the allocating step is dynamically responsive to the spatial extent of change of graphic image data between successive time periods. This feature may be implemented in software or firmware as a part of the memory management software routines that perform the allocation of memory to display contents buffering. Those of skill in the art will understand that many MMUs provide such dynamic allocation of memory based upon relative demand, for example, between memory consuming tasks. In accordance with the invention, such dynamic allocation is performed such that in times of relatively high demand, i.e. when the extent of change is relatively high, a larger amount of memory is allocated to the buffering task, and in times of relatively low demand, i.e., when the extent of change is relatively low, a smaller amount of memory is allocated to the buffering task. This latter case, that of relatively low demand due to a small extent of change, is illustrated in FIGS. 1, 4A and 4B wherein it may be seen that only one cell changes over a significant time frame.

The dynamic nature of the allocation is such that in this low rate-of-change environment, very little memory need be allocated and in a distinctly different higher rate-of-change environment, the memory allocation software automatically adjusts the memory allocation algorithm so that only as much memory as is needed is allocated under changing graphic overlay environments and the variety of uses to which the overlay graphics are put.

This relatively conservative allocation step achieves potentially significant memory savings, as described and illustrated herein, since it uses buffer memory only as needed in a dynamic allocation thereof instead of assuming that the entire graphic overlay buffer will change between successive fields or that every region of the screen has visible overlay graphic data in it. It also significantly reduces pixel processing overhead, since only those pixels affected by change between successive fields need be stored in variable-size tile buffer 22 and processed by graphic processor 20.

The determining and allocating steps now may be understood. The determining and the allocating steps are characterized such that a two-dimensional orthogonal array of pixel-containing cells is produced in update memory buffer. The orthogonal array contains cells of a defined number and location, or geography. The number and location of cells are determined at least in part by the spatial extent of change of graphic image data between successive time periods. This is described in detail above, by reference to FIGS. 3, 4A and 4B.

While the invention has been disclosed in one form, the specific embodiments thereof as disclosed and illustrated herein are not to be considered in a limiting sense as numerous variations are possible and no single feature, function or property of the disclosed embodiments is essential. The invention is to be defined by the scope of the issued claims.

What is claimed is:

1. In a system comprised of a display monitor and a graphic processor for processing an overlay window image and a background image for simultaneous display on the monitor, and wherein the system comprises a background buffer for storing data corresponding to the background image and an overlay buffer for storing data corresponding to the overlay window image, a method for reducing the amount of data that must be processed when the overlay window image is updated, the method comprising:

defining a plurality of overlay: window cells which correspond to the overlay window;

determining which overlay window cells are visible and thus subject to change over a given period of time, and which are transparent and thus not subject to change over the same period of time;

identifying which of one or more visible overlay window cells has actually changed over the given period of time;

allocating within an update buffer, one or more update buffer cells corresponding to each of one or more visible overlay window cells that has been identified as changing over the given period of time; and processing data to create a blended image that includes both the background image and the overlay image as it changes, by blending (i) only that data from the one or more update buffer cells that have been allocated for each of the one or more visible overlay window cells identified as changing, with (ii) data for the background image that corresponds to the location of the one or more visible overlay window cells identified as changing.

2. The method of claim 1, wherein said blending includes weighting the overlay image data with the background image data in a defined ratio to produce a transparent overlay of such overlay image data on the background image for said displaying.

3. The method of claim 1, wherein said allocating is dynamically responsive to the spatial extent of change of overlay image data between successive time periods, said allocating being characterized in that when the extent of change is relatively high, a larger amount of memory is allocated to the update buffer and when the extent of change is relatively low, a smaller amount of memory is allocated to the update buffer.

4. The method of claim 1, wherein said identifying and said allocating are characterized such that a two-dimensional orthogonal array of pixel-containing cells is produced in the update buffer, the orthogonal array containing cells of a number and location determined at lent in part by a spatial extent of change of overlay image data between successive time periods.

5. The method of claim 4 in which the update buffer contains a given number of pixels, wherein said identifying and said allocating are performed in such manner that the produced cells are of predefined size and shape containing a predefined number of the pixels within the update buffer.

6. The method of claim 1, wherein each of the allocated one or more update buffer cells is an onscreen update buffer cell, and wherein changes to the corresponding overlay window cell are made directly to the one or more onscreen update buffer cells.

7. The method of claim 1, wherein each of the allocated one or more update buffer cells is a new offscreen update buffer cell, and wherein changes to the corresponding overlay window cell are made directly to the one or more new offscreen update buffer cells.

8. The method of claim 1, wherein the update buffer includes at least one existing onscreen update buffer cell that has been allocated prior to the one or more new offscreen update buffer cells, the method further comprising:

swapping the one or more new offscreen update buffer cells with the at least one existing onscreen update buffer cell, such that one or more new offscreen update buffer cells become one or more onscreen update buffer cells, and such that the at least one existing onscreen update buffer cell is no longer used; and deallocating the at least one existing onscreen update buffer cell after it is no longer used.

9. The method of claim 8, wherein only a portion of the one or more update buffer cells corresponding to each of the one or more visible overlay windows cells that has been identified as changing over the given period of time are allocated initially, and wherein the method further comprises iteratively allocating, swapping, and deallocating, until all of the one or more update buffer cells have been allocated.

10. The method of claim 1, wherein the overlay buffer stores only a portion of the data corresponding to the overlay window image at any given time.

11. The method of claim 1, wherein none of doe one of more visible overlay window cells is identified as actually changing over the given period of time.

12. In a system comprised of a display monitor and a graphic processor for processing an overlay window image and a background image for simultaneous display on the monitor, and wherein the system comprises a background buffer for storing data corresponding to the background image and an overlay buffer for storing data corresponding to the overlay window image, a method for reducing the amount of data that must be processed when the overlay window image is updated, the method comprising:

defining a plurality of overlay window cells which correspond to the overlay window;

identifying which of one or more overlay window cells has actually changed over a given period of time;

allocating within an update buffer, one or more update buffer cells corresponding to each of one or more overlay window cells that has been identified as changing over the given period of time, wherein each of the allocated one or more update buffer cells is either an onscreen update buffer cell or a new offscreen update buffer cell, and wherein changes to the corresponding overlay window cell are made directly to the one or more update buffer cells; and processing data to create a blended image that includes both the background image and the overlay image as it changes, by blending (i) only tat data from the one or more update buffer cells that have been allocated for each of the one or more overlay window cells identified as changing, with (ii) data for the background image that corresponds to the location of the one or more overlay window cells identified as changing.

13. The method of claim 12, wherein the update buffer comprises at least one existing onscreen update buffer cell that has been allocated prior to one or more new offscreen update buffer cells, the method further comprising:

swapping the one or more new offscreen update buffer cells with the at least one existing onscreen update buffer cell, such that one or more new offscreen update buffer cells become one or more onscreen update buffer cells, and such that the at least one existing onscreen update buffer cell is no longer used; and deallocating the at least one existing onscreen update buffer cell after it is no longer used.

14. The method of claim 13, wherein only a portion of the one or more update buffer cells corresponding to each of the one or more overlay windows cells that has been identified as changing over the given period of time are allocated initially, and wherein the method further comprises iteratively allocating, swapping, and deallocating, until all of the one or more update buffer cells have been allocated.

15. The method of claim 12, further comprising determining which overlay window cells are visible and thus subject to change over a given period of time, and which are transparent and thus not subject to change over the same period of time.

16. The method of claim 12, wherein the overlay buffer stores only a portion of the data corresponding to the overlay window image at any given time.

17. A graphics system for using a display monitor to display a blended image comprised of a background image and an overlay window image, comprising:

a graphic processor for processing the overlay window image and the background image for simultaneous display on the display monitor;

a background buffer for storing data corresponding to the background image, and for communicating data to the graphic processor;

an overlay buffer for storing data corresponding to the overlay window image, and for communicating data to the graphic processor; and buffer control means for controlling the amount of data that must be processed when the overlay window image is updated, said buffer control means comprising:

means for defining a plurality of overlay window cells which correspond to the overlay window;

means for determining which overlay window cells are visible and thus subject to change over a given period of time, and which are transparent and thus not subject to change over the same period of time;

means for identifying which of one or more visible overlay window cells has actually changed over the given period of time;

means for allocating within an update buffer, one or more update buffer cells corresponding to each of one or more visible overlay window cells that has been identified as changing over the given period of time; and means for communicating data as determined by the buffer control means to the graphic processor, the graphic processor thereafter processing the received data to create a blended image that includes both the background image and the overlay image as it changes, by blending (i) only that data from the one or more update buffer cells that have been allocated for each of the one or more visible overlay window cells identified as changing, with (ii) data for the background image that corresponds to the location of the one or more visible overlay window cells identified as changing.

18. The graphics system of claim 17, wherein the graphic processor comprises means for weighting the overlay image data with the background image data in a defined ratio to produce a transparent overlay of the overlay image data on the background image for displaying.

19. The graphics system of claim 17, wherein the allocating means is dynamically responsive to the spatial extent of change of overlay image data between successive time periods, the allocating means being characterized in that when the extent of change is relatively high, a larger amount of memory is allocated to the update buffer and when the extent of change is relatively low, a smaller amount of memory is allocated to the update buffer.

20. The method of claim 17, wherein the means for identifying and the means for allocating are characterized such that a two-dimensional orthogonal array of pixel-containing cells is produced in the update buffer, the orthogonal array containing cells of a number and location determined at least in part by a spatial extent of change of overlay image data between successive time periods.

21. The graphics system of claim 17, wherein each of the allocated one or more update buffer cells is an onscreen update buffer cell, the graphics system further comprising means for directly changing the one or more onscreen update buffer cells based on changes to the corresponding overlay window cell.

22. The graphics system of claim 17, wherein each of the allocated one or more update buffer cells is a new offscreen update buffer cell, the graphics system further comprising means for directly changing the one or more offscreen update buffer cells based on changes to the corresponding overlay window cell.

23. The graphics system of claim 22, wherein the update buffer includes at least one existing onscreen update buffer cell that has been allocated prior to the one or more new offscreen update buffer cells, the graphics system further comprising:

means for swapping the one or more new offscreen update buffer cells with the at least one existing onscreen update buffer cell, such that one or more new onscreen update buffer cells become one or more onscreen update buffer cells, and such that the at least one existing onscreen update buffer cell is no longer used; and means for deallocating the at least one existing onscreen update buffer cell after it is no longer used.

24. The graphics system of claim 23, wherein only a portion of the one or more update buffer cells corresponding to each of the one or more visible overlay windows cells that has been identified as changing over the given period of time are allocated initially, and wherein the graphics system further comprises means for iteratively allocating, swapping, and deallocating, until all of the one or more update buffer cells have been allocated.

25. The graphics system of claim 17, wherein the overlay buffer is sized so as to store only a portion of the overlay window image at any given time.

26. The graphics system of claim 17, wherein the means for identifying does not identify any of the one or more visible overlay window cells as actually changing over the given period of time.

* * * * *

UNITED STATES PATENT AND TRADEMARK OFFICE
CERTIFICATE OF CORRECTION

PATENT NO.    : 6,396,473 B1
DATED         : May 28, 2002
INVENTOR(S)   : Sean M. Callahan and David R. Anderson It is certified that error appears in the above-identified patent and that said Letters Patent is hereby corrected as shown below:

Column 1,
Lines 26 and 29, after "WEBTV" please insert -- ® --

Column 6,
Line 8, after "within a graphic" change "overly" to -- overlay --

Column 8,
Line 7, after "need to allocate" change "file" to -- tile --

Column 12,
Line 45, after "plurality of overlay delete ":"

Column 13,
Line 18, after "location determined at" change "lent" to -- least --
Line 58, after "wherein none of" change "doe" to -- the --
Line 58, after "one" change "of" to -- or --

Column 14,
Line 18, after "blending (i) only" change "tat" to -- that --

Column 16,
Line 22, after "one or more new" change "onscreen" to -- offscreen --

Signed and Sealed this

Fourth Day of March, 2003

JAMES E. ROGAN
*Director of the United States Patent and Trademark Office*